United States Patent [19]

Tsuchida et al.

[11] Patent Number: 4,724,920
[45] Date of Patent: Feb. 16, 1988

[54] REAR SUSPENSION SYSTEMS FOR AUTOMATIC TWO-WHEELED VEHICLES

[75] Inventors: Tetsuo Tsuchida; Tetsuo Mikami, both of Fujimi, Japan

[73] Assignee: Honda Giken Kogyo Kabushiki Kaisha, Tokyo, Japan

[21] Appl. No.: 805,515

[22] Filed: Dec. 6, 1985

[51] Int. Cl.[4] .................. B60G 3/18; B60G 13/00; B62K 25/04; B62K 25/20
[52] U.S. Cl. ..................... 180/227; 280/284
[58] Field of Search ............... 180/219, 227; 280/284 R, 275

[56] References Cited

U.S. PATENT DOCUMENTS

| | | | |
|---|---|---|---|
| 463,710 | 11/1891 | Mathews | 280/275 |
| 3,948,543 | 4/1976 | MacDonald et al. | 280/284 |
| 4,265,329 | 5/1981 | Cortanze | 280/275 X |
| 4,415,057 | 11/1983 | Yamaguchi | 180/227 |
| 4,511,013 | 4/1985 | Miyakoshi et al. | 180/227 |
| 4,515,236 | 5/1985 | Kanamori | 180/227 |
| 4,558,761 | 12/1985 | Boyesen | 180/227 |
| 4,561,519 | 12/1985 | Omori | 180/227 |

Primary Examiner—John J. Love
Assistant Examiner—Mitchell J. Hill
Attorney, Agent, or Firm—Armstrong, Nikaido, Marmelstein & Kubovcik

[57] ABSTRACT

In a motorcycle having a rear suspension located between a body frame and a rear wheel-supporting member supported on the body frame for vertically rocking movement to rotatably support a rear wheel, the rear suspension is disposed below and along the rear wheel-supporting member to increase the minimum height of the body from the road surface for the purpose of lowering the center of gravity thereof and locate a seat at a lower position.

1 Claim, 13 Drawing Figures

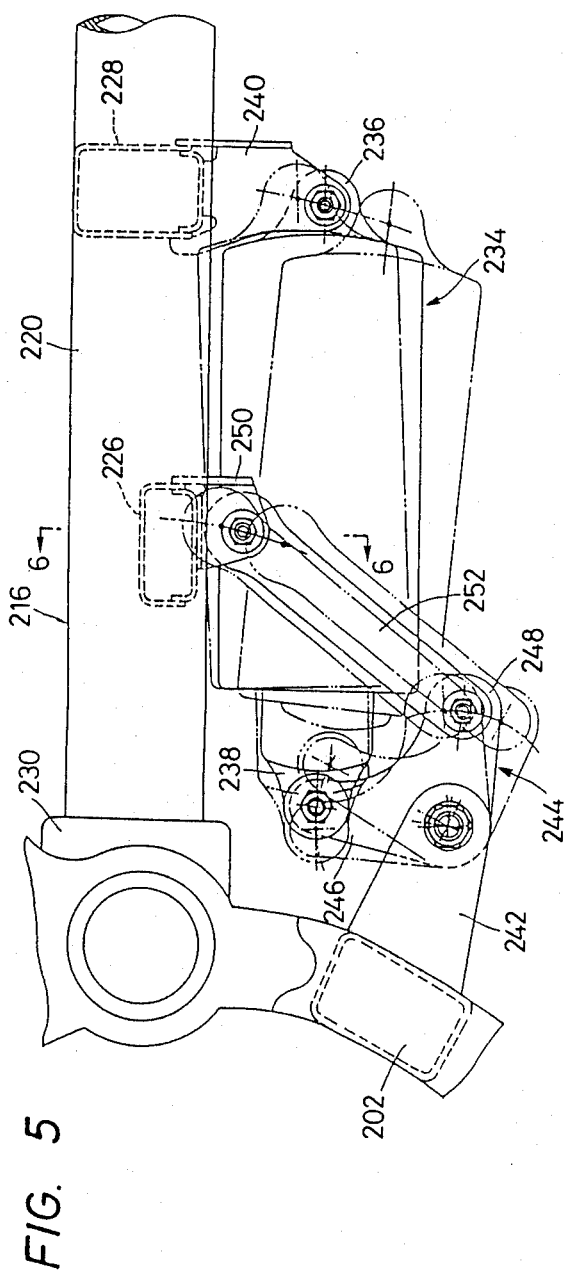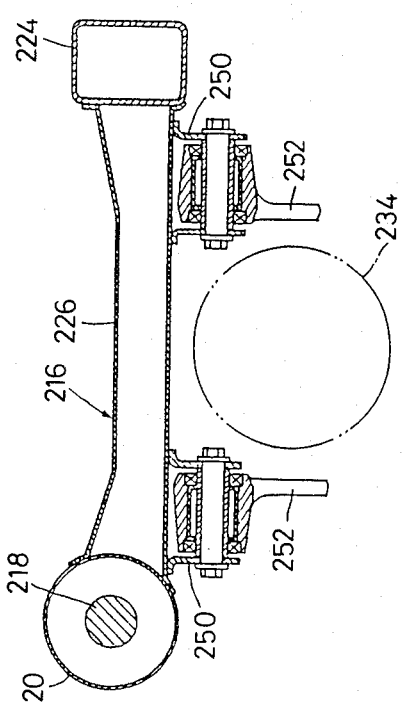
FIG. 5
FIG. 6

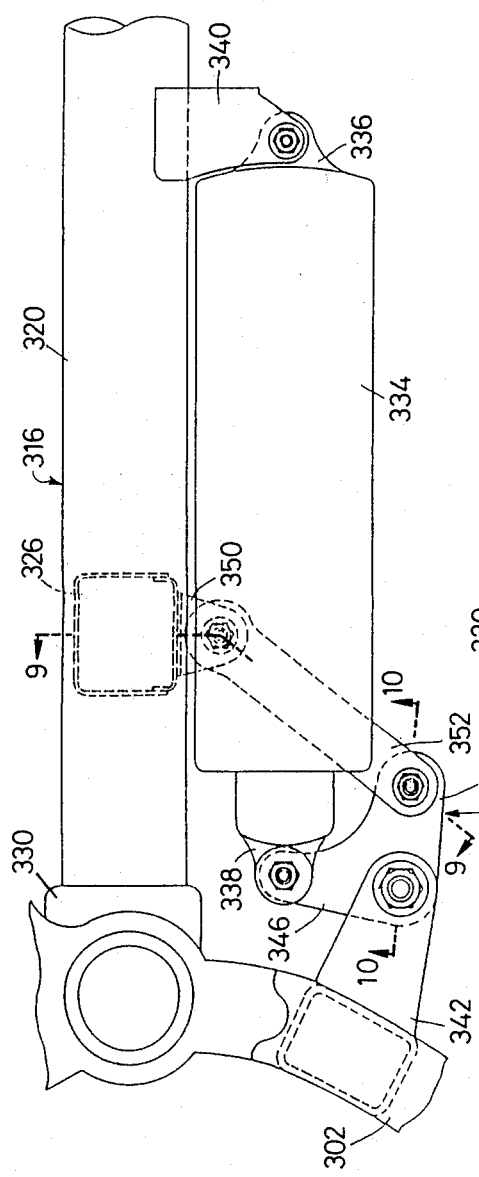

REAR SUSPENSION SYSTEMS FOR AUTOMATIC TWO-WHEELED VEHICLES

FIELD OF THE INVENTION AND RELATED ART STATEMENT

The present invention relates to a rear suspension system for automatic two-wheeled vehicles or motorcycles.

The prior art rear suspension systems for motocycles designed to absorb and buffer vertically rocking movement of a rear wheel caused due to the inequality in a road surface and thereby prevent propagation of vibration to the body are known to be of the conventional suspension type, shown in FIG. 1, including rear suspension 108 each arranged between a seat rail 106 and a rear wheel 102 supporting portion of a rear fork 104 held on a body frame 100 for vertically rocking movement, and the single suspension type, shown in FIG. 2, including a single suspension 110 arranged between a seat rail 106 and a portion of a rear fork 104 positioned in front of a rear wheel 102 through a linkage 112.

When the conventional or single type suspension is applied to a motorcycle having a seat positioned at a lower position, however, some limitations are often imposed by the position of a part 114 such as a battery.

For that reason, it is known that a rear suspension 118 is located below an engine 116 mounted on a body frame 100, and is coupled to a rear fork 104 through a linkage 120, as shown in FIG. 3. Owing to the arrangement wherein the rear suspension 118 is located below the engine 116, it is at the lowermost position, as indicated by 122 (the minimum height from the road surface). To mount the rear suspension at a higher position, the engine should be located at a higher position, correspondingly, thus resulting in elevation of the center of gravity.

OBJECT AND SUMMARY OF THE INVENTION

In view of the foregoing, the present invention has for its object to provide a rear suspension system which serves to increase the minimum height of a motorcycle from the road surface to lower the center of gravity of the body and locate a seat at a lower position.

According to the present invention, this object is achieved by provision of a rear suspension system wherein a rear suspension to be located between a body frame and a rear wheel-supporting member supported on a body frame for vertically rocking movement to rotatably support the rear wheel is disposed below and along said rear wheel-supporting member.

BRIEF DESCRIPTION OF THE DRAWINGS

FIGS. 4 to 6 inclusive show one embodiment of the present invention, FIG. 4 being a side view of a motorcycle, FIG. 5 being a side view of the rear suspension for illustrating the cushioning action thereof, and FIG. 6 being a sectional view taken along the line 6—6 of FIG. 5;

FIGS. 7 to 10 inclusive show another embodiment of the present invention, FIG. 7 being a side view of a motorcycle, FIG. 8 being a side view of the rear suspension arranged in place, FIG. 9 being a sectional view taken along the line 9—9 of FIG. 8, and FIG. 10 being a sectional view taken along the line 10—10 of FIG. 8.

DETAILED DESCRIPTION OF THE PREFERRED EMBODIMENTS

Figure 4:
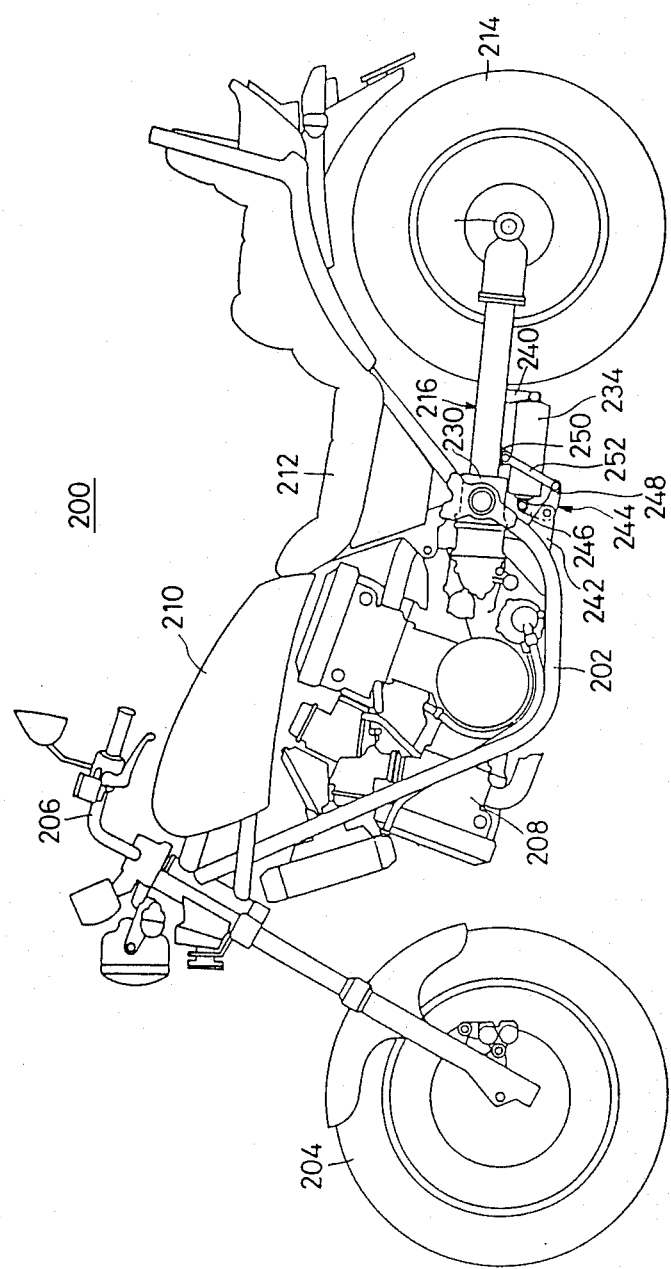

FIGS. 4 to 6 inclusive show one embodiment of the present invention. A motorcycle generally shown at 200 includes a body frame 202, a front wheel 204 to be steered through a handlebar 206, an engine 208 mounted on the body frame 202, a fuel tank 210, a seat 212, a rear wheel 214, and a rear fork 216 which provides a member for rotatably supporting the rear wheel 214 and is supported on the body frame 202 for vertically rocking movement.

As illustrated in the sectional view of FIG. 6, the rear fork 216 comprises one arm member 220 with a built-in drive shaft 218 and other arm member 224 coupled thereto with cross members 226 and 228. As can be seen from FIGS. 4 and 5, the rear fork 216 is supported at the front end on the body frame 202 for vertically rocking movement and supports at the rear end the rear wheel 214 for rotating movement. A drive force is then transmitted from the engine 208 to the rear wheel 214 via the drive shaft 218.

In the vicinity of the body frame 202 and just below the rear fork 216, there is arranged one rear suspension 234 along the rear fork 216.

The rear suspension 234 is supported at the rear end 236 on a bracket 240 mounted on the cross member 228 of the rear fork 216 and at the front end 238 on one arm 246 of a link 244 rotatably mounted on a bracket 242 of the body frame 202. The other arm 248 of the link 244 is supported on one end of a pair of cone rods 252 supported at the other end on a bracket 250 mounted on the cross member 226 of the rear fork 216.

The buffering or cushioning action of the rear suspension mechanism thus constructed will now be explained with reference to FIG. 5.

At the minimum load, the rear suspension 234 has the rear end 236 directed somewhat downwardly, as shown by a two-dotted line. In the standard loading state where a rider is seated on the seat 212, the rear fork 216 is lifted up, whereby the rear end 236 of the rear suspension 234 is located at the position shown by a solid line, and the cone rods 252 turn the link 244 to cause one arm 246 thereof to pull the front end 238 of the rear suspension 234, whereby the rear suspension 234 is put in a substantially horizontal state.

At the maximum load, the rear end 236 of the rear suspension 234 ascends as the rear fork 216 ascends. Then, the amount of turning of one arm 246 of the link 244 is so large that the front end 238 of the rear suspension 234 is pulled to cause further extension of the rear suspension 234 for cushioning.

Since the rear suspension 234 is placed in a space between the portion of the body frame 202 below the rear fork 216 and the rear wheel 214 to secure the length and stroke required for cushioning, it is possible to lower the position of the seat 212 and the center of gravity of the body and diminish the size of the body. Also reinforced is the structure of the portion to which the suspension is attached.

Another embodiment of the present invention is illustrated in FIGS. 7 to 10 inclusive.

Figure 7:
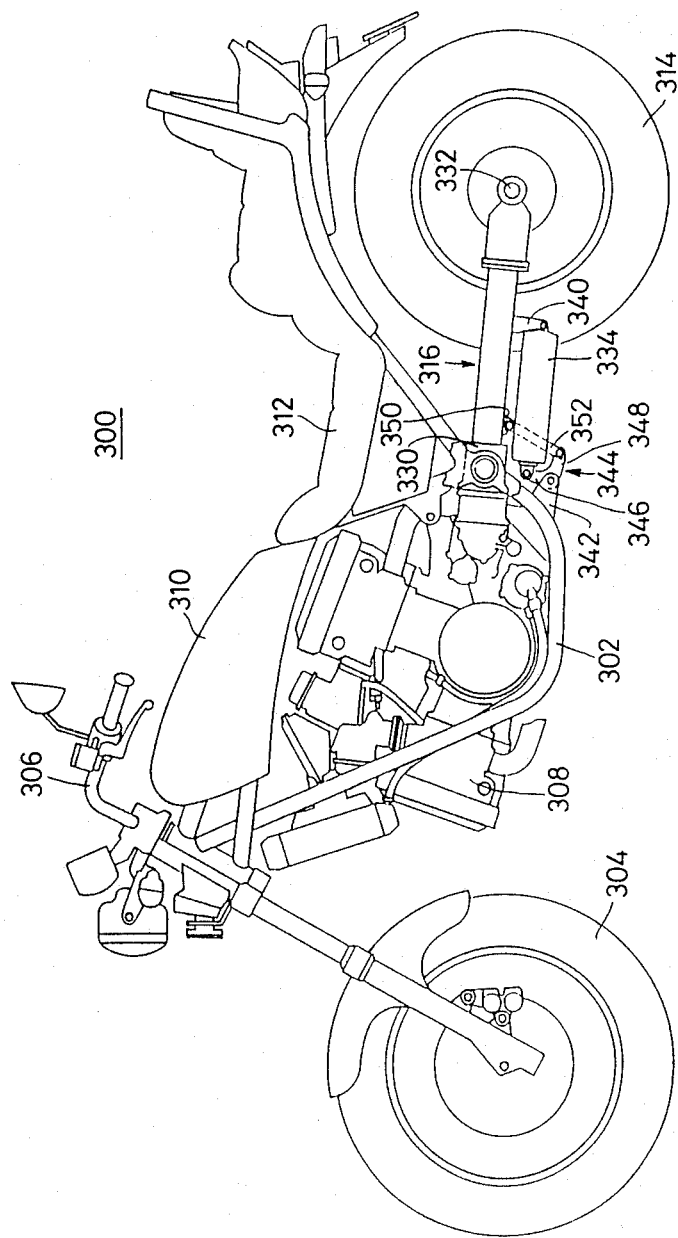
Figure 10:
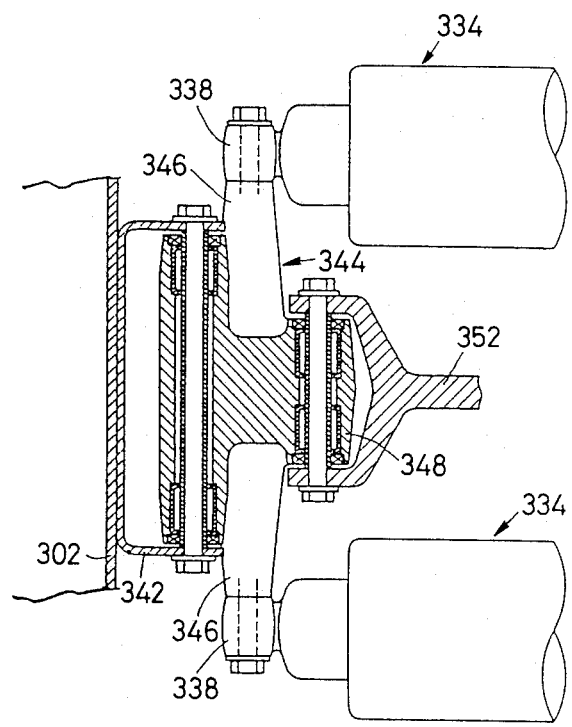

Referring to FIG. 7 illustrative of the side of a motorcycle, it is generally shown at 300, and includes a body frame 302, a front wheel 304 to be steered through a handlebar 306, an engine 308 mounted on the body frame 302, a fuel tank 310, a seat 312, a rear wheel 314, and a rear fork 316 which provides a rear wheel supporting member.

As illustrated in the sectional view of FIG. 9, the rear fork 316 comprises one arm member 320 with a built-in drive shaft 318 and the other arm member 324 coupled thereto with cross members 326. As can be seen from FIGS. 7 and 8, the rear fork 316 is supported at the front end on the body frame 302 for vertically rocking movement and supports at the rear end the rear wheel 314 for rotating movement. A drive force is then transmitted from the engine 308 to the rear wheel 314 via the drive shaft 318.

In the vicinity of the body frame 302 and below both arms 320 and 324 of the rear fork 316, there are arranged two rear suspensions 334 and 334 along the rear fork 316.

The rear suspensions 334 and 334 are each supported at the rear ends 336 on brackets 340 mounted on both arms 320 and 324 of the rear fork 316 and at the front ends 338 on one arm 346 of a link 344 rotatably mounted on a bracket 342 of the body frame 302. The other arm 348 of the link 344 is supported on one end of a cone rod 352 supported at the other end on a bracket 350 mounted on the cross member 326 of the rear fork 316.

In this arrangement, the rear suspensions 334 and 334 are extended below the rear fork 316 and beween the body frame 302 and the rear wheel 314 to secure the lengh and stroke required for cushioning. It is thus possible to lower the position of the seat 312 and the center of gravity of the body and make effective use of a dead space in the body, thereby diminishing the size thereof.

Figure 1:
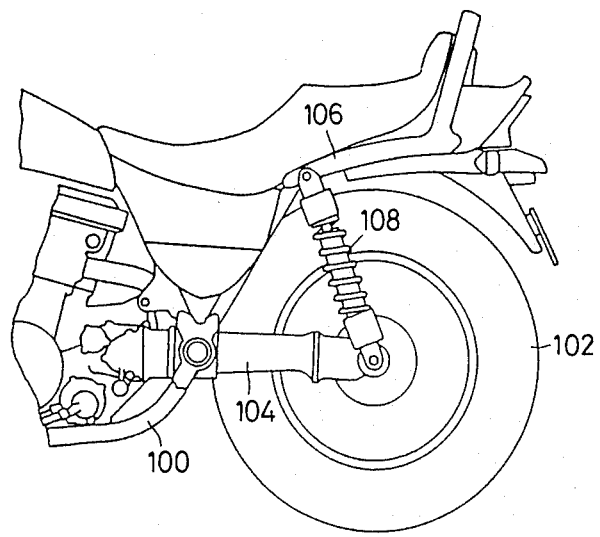
FIGS. 1 to 3 inclusive show the prior art rear suspension systems of motorcycles, FIG. 1 being a side view of the rear portion of the body of a motorcycle and showing the conventional suspension type, FIG. 2 being a side view of the rear portion of the body of a motorcycle and showing the single suspension type, and FIG. 3 being a side view of the rear portion of the body of a motorcycle and showing the type wherein a rear suspension is disposed below an engine.
Figure 2:
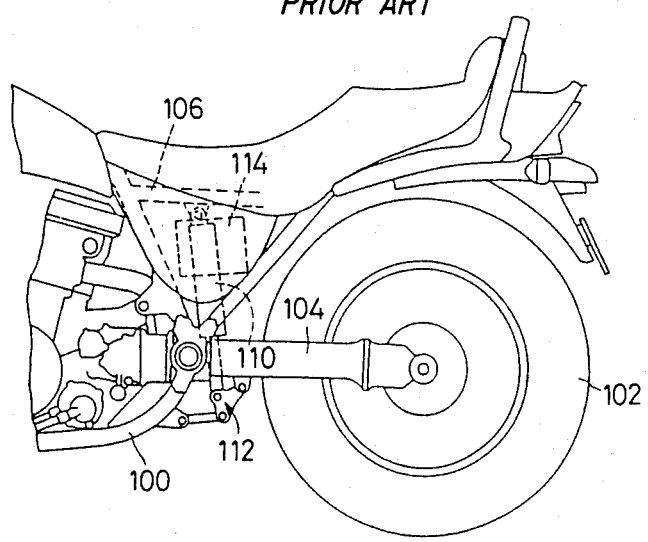
Figure 3:
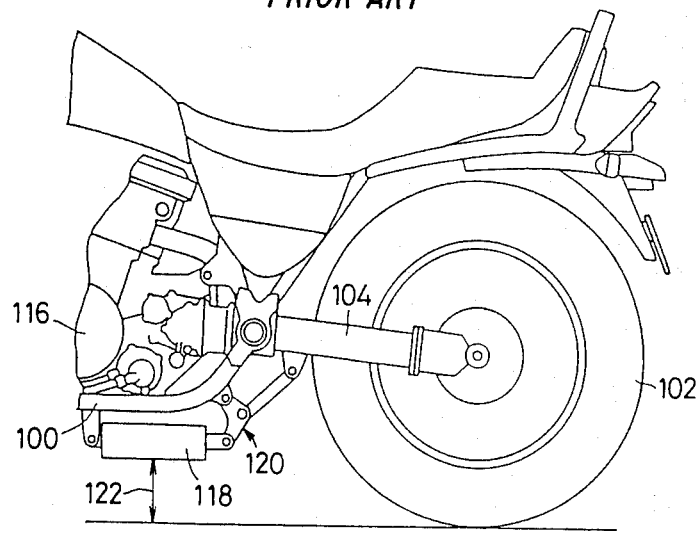
Figure 13:
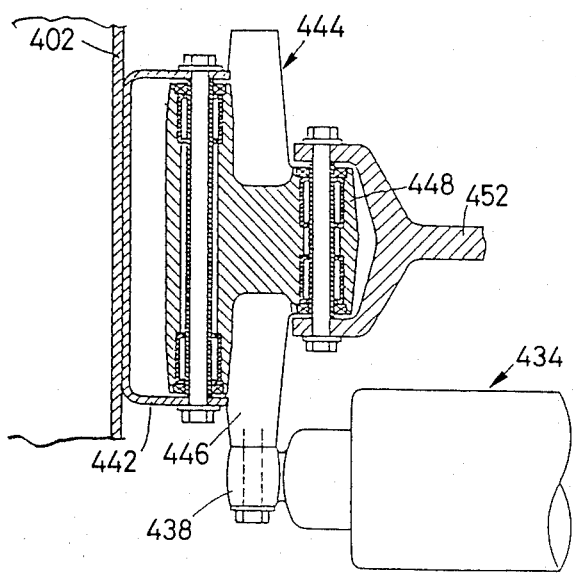
FIGS. 11 to 13 inclusive show a further embodiment of the present invention, FIG. 11 being a side view of the rear suspension arranged in place, FIG. 12 being a sectional view taken along the line 12—12 of FIG. 11, and FIG. 13 being a sectional view taken along the line 13—13 of FIG. 11.
Figure 11:
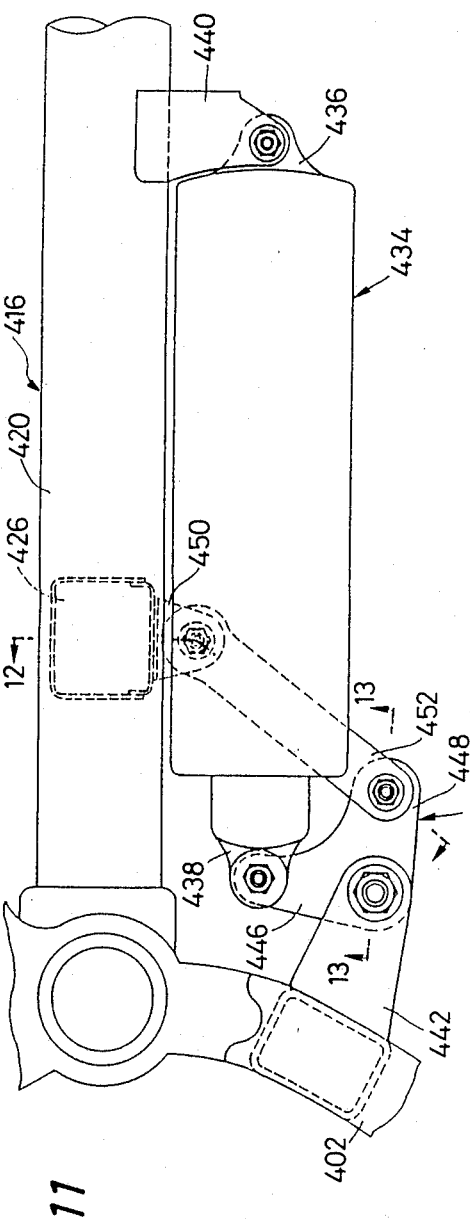
Figure 12:
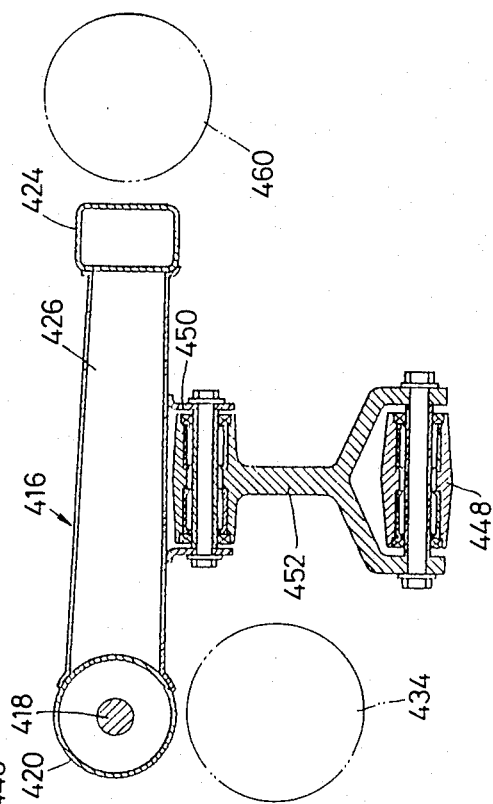

FIGS. 11 to 13 inlcusive show a further embodiment of the present invention, wherein a substantially horizontal rear suspension 434 is arranged below a rear fork 416, for instance, below one arm member 420 and extends from the rear portion of a body frame 402 to the side of a rear wheel, and a muffler 460 is located adjacent to the other arm member 424 of the rear fork 416.

The rear suspension 434 is supported at the rear end 436 on a bracket 440 mounted on one arm member 420 of the rear fork 416 and at the front end 438 on one arm 446 of a link 444 rotatably mounted on a bracket 442 of the body frame 402. The other arm 448 of the link 444 is connected to a cone rod 452 which is in turn connected to a bracket 450 mounted on the cross member 426 of the rear fork 416. Reference numeral 418 stands for a drive shaft.

The rear suspension arrangement according to this embodiment has an effect similar to that obtained in each of the aforesaid embodiments. Besides, it is possible to improve the horizontal balance of the body with a combination of one rear suspension 434 with the muffler 460.

We claim:

1. A rear wheel suspension for a motorcycle comprising a body frame, a rear wheel-supporting member pivotally supported at one of its ends on said body frame for vertical rocking movement of its other end, a rear wheel mounted on said wheel-supporting member at said vertical rocking movement other end of said wheel-supporting member and a rear suspension member disposed below and along said rear wheel-supporting member, said rear suspension member being pivotally connected at its rear end on a bracket of said rear wheel-supporting member and being pivotally connected at its front end on one arm of a link rotatably mounted on said body frame, said link having a second arm pivotally connected to one end of a cone rod supported at the other end on said rear wheel-supporting member.

* * * * *